June 9, 1964     R. E. LINDSTRÖM     3,136,608
ARRANGEMENT FOR THE AEROBIC BIOLOGICAL TRANSFORMATION
OF ORGANIC WASTE MATERIAL Filed Aug. 20, 1962     2 Sheets—Sheet 1

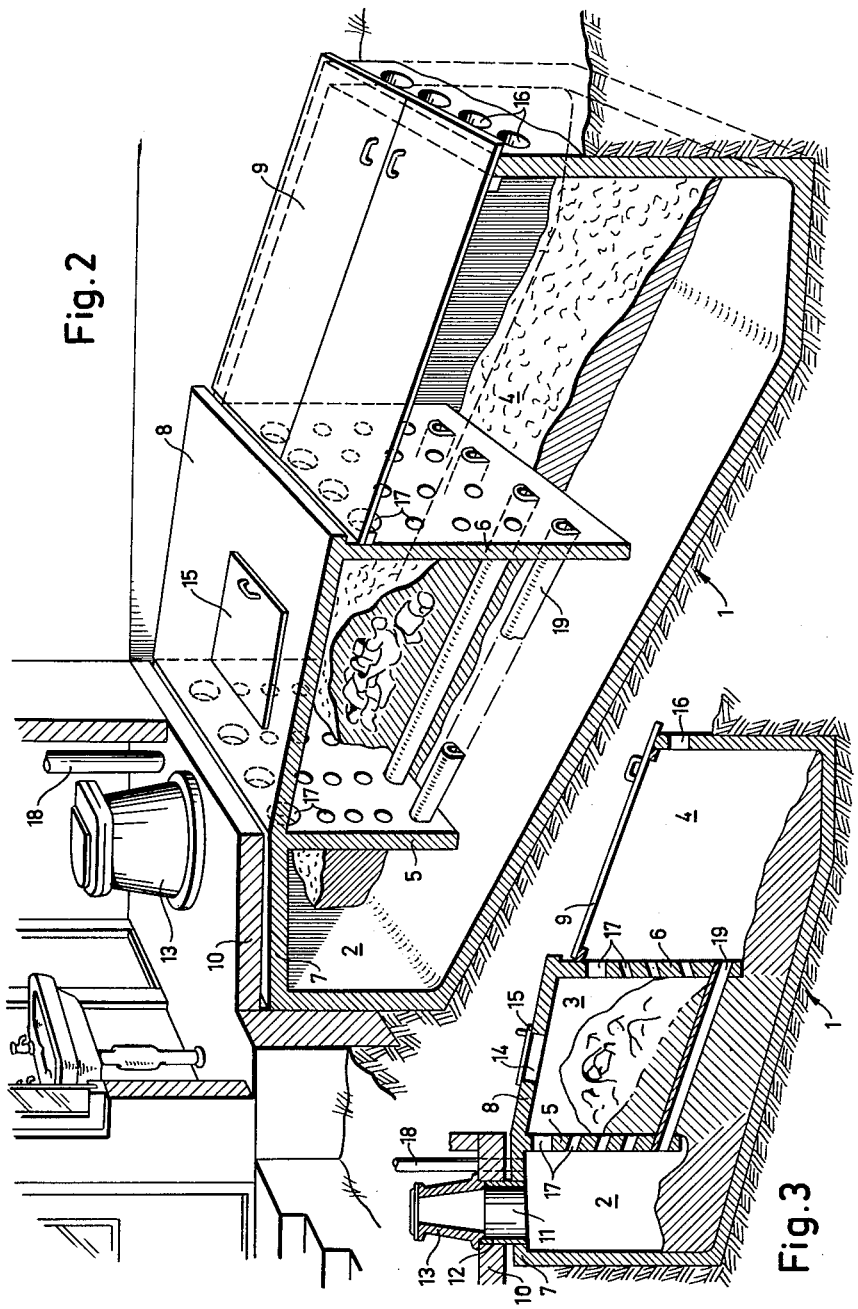

United States Patent Office 3,136,608
Patented June 9, 1964

3,136,608
ARRANGEMENT FOR THE AEROBIC BIOLOG-
ICAL TRANSFORMATION OF ORGANIC
WASTE MATERIAL
Rikard Emanuel Lindström, Tonstigen 6,
Tyreso, Sweden
Filed Aug. 20, 1962, Ser. No. 218,069
Claims priority, application Sweden Aug. 25, 1961
6 Claims. (Cl. 23—259.1)

The successively increasing contamination of soil and water caused by sewer systems entails serious troubles and problems. Soil and water wells are infected by waste disposal systems that are dug into the ground in the form of open ditches and leaking sewer pipes. Likewise, lakes, rivers and coastal regions of oceans are supplied with waste from continuously expanding sewer networks. The lack of efficient purification plants leads to a successive increase of the impurity concentration.

A satisfactory purification according to the methods now used requires extensive and expensive transport and purification systems engaging inter alia distribution networks for electricity, water and waste as well as vehicles, apparatus, buildings, ground areas and staff. The high installation and operation costs connected with these methods do to a certain extent explain why it has not been possible to arrange in a satisfactory manner the purification of waste products, not even in cities.

In the conventional plants for purification of the waste the latter is mixed with water. Considerable amounts of clean water are thus needed only to serve as a transport agent for the waste. Excrements are transported in the sewer pipes mixed with a water volume that is about 100 times their own volume. Especially in regions where the supply of fresh water is restricted this conventional method is not rational, but at least as far as the cities are concerned it has for several reasons hitherto been the only one generally adopted.

Purification plants of simple construction, as well as all kind of waste wells, do not effect a satisfactory purification of the waste water but instead only separate the coarse material from the liquid.

The purification plants of high efficiency as well as the plants for burning excrements and garbage now existing or under construction in cities and towns are obviously too expensive to be used in a sufficiently great number in all the regions where effective purification devices are needed. In certain regions the sites of the houses or the character of the terrain makes it difficult or impossible to arrange sewer systems and central purification plants. This is true for example as far as archipelagos and steep hilly regions are concerned.

There is thus a considerable need of simpler (but at the same time efficient) methods and plants which to a great extent can eliminate the need of transports and complicated purification processes.

The fact that the waste is mixed with considerable amounts of water complicates the purification. Therefore, it is desirable to the highest possible extent to avoid supplying excrements, animalic waste and other insanitary products into the sewer networks.

The present invention relates to a method for effecting an aerobic biological transformation of organic waste and said method is mainly characterized by the fact that said waste is introduced into at least one primary compartment, air being admitted into said compartment, the waste being (through the action of gravity) successively displaced downwards to a secondary compartment, the speed of displacement being selected in such a manner that upon its arrival to said second compartment said waste is essentially mouldered.

The invention does also relate to an arrangement for carrying out the above method. The principal characteristic of the arrangement is that it does essentially comprise a container, a number of vertical partitions dividing said container into at least one primary compartment, reception compartment, and at least one secondary compartment, storage compartment, said compartments being provided with ventilation means and communicating with each other through passages in the lower portions of said partitions, said passages being dimensioned in such a way and the bottom of said container being of such a nature and having such an inclination from the reception compartments towards the storage compartment that the waste successively slides from said reception compartments down towards said storage compartment with such a speed, that upon arriving at said last mentioned compartment it is essentially mouldered.

According to the invention it is possible, without the use of any mechanical auxiliaries and without the addition of chemical preparations or water, to attain aerobic biological transformation of organic waste of all kinds, e.g., excrements and garbage, the final product formed constituting a first-rate fertilizer.

According to the desired capacity of the arrangement it may be constructed in smaller as well as in bigger units which may be connected directly to the places or buildings at which the waste is produced. Thus, the arrangement may be used for instance at dwelling-houses or outhouses and serve as a closet, a garbage container, a device for biological transformation and as a collection and storing place for transformed waste (compost).

Because of the fact that water is not utilized as a transport agent for the waste and as it is not suitable to increase the moisture content thereof above its inherent value, the arrangement shall not be connected to water or sewer pipes. Further, the arrangement is provided with tight side-walls and with a tight bottom whereby infection of the surrounding ground is entirely avoided. The ventilation necessary to guarantee the desired transformation and absolutely odour-free conditions is according to the invention effected by means of suitable ventilation passages, the air flow through said passages being promoted by the heat generated during the transformation process. In an experimental plant it has been found that no disagreeable odour whatever is formed.

Thanks to the fact that an arrangement of the kind here at issue operates entirely independently of transport means and other auxiliaries the only costs involved are the construction costs which are insignificant in comparison to the costs connected with the prior art arrangements for treating waste products. From a sanitary standpoint the arrangement is comparable to high-efficient purification plants connected to tight sewer pipe networks.

The invention is in the first place intended to be applied on the one hand in such regions where no waste purification arrangements are available and on the other hand in such cases where the sewer networks present are not connected to efficient purification plants or due to leakage cause contamination of the soil. Moreover, the invention is applicable in all the instances where the transport and the elimination of waste, garbage and excrements cause practical or economical problems. Difficulties of the kind last referred to arise in several connections inter alia in various kinds of camps, etc. Finally, it should be stressed that thanks to the fact that the arrangement does not need any artificial auxiliaries it is of great importance as a reserve for the conventional arrangements.

The container forming part of an arrangement according to the invention consists of a tight, strong material such as concrete or any other suitable material. As a rule, a considerable portion thereof is located below the ground level on a firm and drained bed. When the container is connected to a house it is conveniently placed in the vicinity of an outer wall thereof and partly located below the floor of the house. When used in connection with dwelling-houses or outhouses the arrangement does preferably comprise two reception compartments, the one located at the highest level being connected to a closet stool or a similar device. Consequently, this compartment serves as a receiver of excrements. The other reception compartment, i.e., the one located between the excrement compartment and the storage compartment, forms a garbage compartment in which waste from kitchens and gardens as well as other organic waste can be placed. Naturally, it is not permissible to place in the arrangement waste of such a nature that no mouldering can take place, e.g., articles of glass, metal, synthetic resin, etc.

One embodiment of the invention will now be described in greater detail, reference being made to the accompanying drawings in which:

FIG. 2 is a perspective sectional view on a greater scale showing the device in FIG. 1; and FIG. 3 is a sectional lateral view of the same device.

Figure 1:
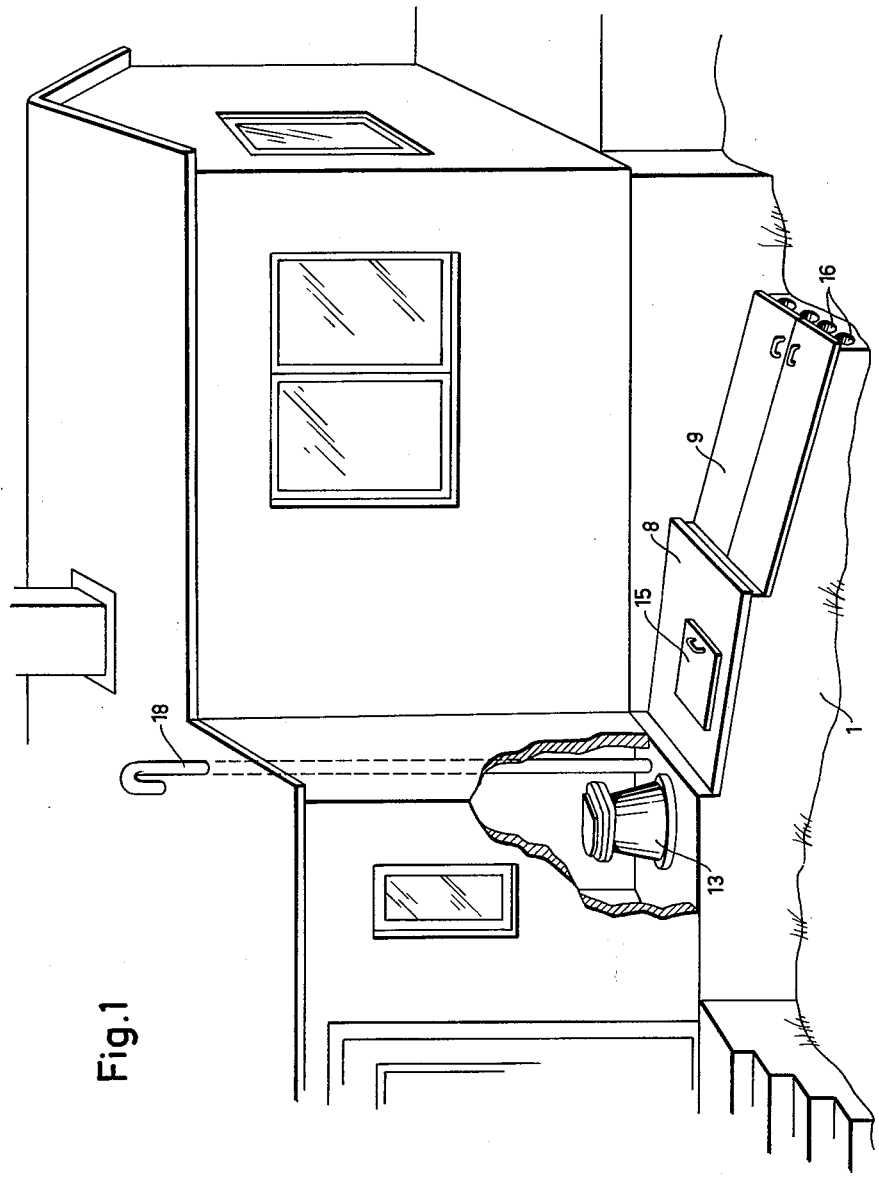
FIG. 1 is a perspective view (partly cut away) of an arrangement designed according to the invention and connected to the toilet room of a small house.

The arrangement shown on the drawings is composed of an elongated container 1 having vertical side walls and being divided by two, likewise vertical, partitions 5 and 6 into three compartments 2, 3 and 4. The greater portion of the bottom of the container is inclined about 15° with respect to the horizontal plane. The three compartments comprise an excrement compartment 2, a garbage compartment 3 and a storage compartment 4. Each of said compartments is provided with a cover 7, 8 and 9, respectively. As appears from the drawings a portion of the container is below ground level. The container is also arranged and located in such a way that the excrement compartment 2, constituting the highest located compartment, protrudes below a self-supported part of the floor frame-work 10 of a toilet room. A vertical tube 12 passes through said floor frame-work and has its lower end connected to an opening 11 in the cover 7 of the excrement compartment and its upper end connected to the bottom portion of a closet stool 13. According to the illustrated embodiment of the invention said stool comprises a conical tube, e.g., of a ceramic material, which at its narrow top end is provided with a seat and a lid while its lower, broader end exhibits a lateral supporting flange. The cover 8 of the garbage compartment 3 has an opening 14 for the introduction of the garbage and a lid 15 normally closing said opening. To make the contents of the storage compartment 4 readily accessible all of the cover 9 may be opened, e.g., lifted or swung.

The partitions 5 and 6 which extend through the entire width of the container have their lower edges spaced from the bottom of the container so that there are formed two transversal passages through which the waste successively slides toward the storage compartment. In order to secure on the one hand an aerobic transformation of the waste so that the products supplied to the storage compartment 4 are substantially mouldered and on the other hand such a ventilation of the arrangement that any unpleasant odor is eliminated, one or more air inlets 16 are disposed in the outer wall of the storage compartment and air passages 17 are provided in the partitions 5 and 6. In addition thereto an outlet pipe 18 passes from the highest point of the compartment 2 through the toilet room and opens above the roof of the building. Suitably the air inlet 16 and the evacuation pipe 18 are each provided with a relatively fine-mesh net preventing insects and other animals from creeping into the interior of the arrangement. Moreover, according to the embodiment illustrated, there are in the lower portion of the garbage compartment arranged a number of downwardly open U-shaped channels 19. These channels, the ends of which are supported in openings in the partitions 5 and 6, extend essentially parallel to the bottom of the container and in the longitudinal direction of the latter. They admit an increased supply of air to the waste located in the lower portion of the garbage compartment. This is of special importance in arrangements having high garbage compartments because the waste might then become comparatively firmly compressed so that the garbage compartment as well as the excrement compartment would get an insufficient supply of air unless these channels were used.

The embodiment of the invention above described and shown on the annexed drawings is only intended to exemplify the practical realization of the inventive idea. A great number of various modifications are, however, feasible within the scope of the claims.

As mentioned before, chemical substances, such as chlorinated lime or the like, should not be introduced into the arrangement because such substances kill the bacteria necessary for the aerobic transformation. Nor is it permissible to introduce water into the container. It has been found that the amount of moisture normally present in the waste is a suitable concentration for the transformation process. The waste having the highest content of moisture is that introduced into the excrement compartment. The urine, which as a rule is the most substantial liquid portion of the waste, is distributed and absorbed by the drier waste mass in the garbage compartment. For that reason, no free liquid is present in the storage compartment.

The rich flora of bacteria developing in the combination of excrements and garbage effects a strikingly rapid mouldering reaction running considerably faster than when garbages solely are supplied to the container. The mouldering process does, to the greatest extent, take place in the garbage compartment. When the arrangement is designed attention must be paid to several various conditions to which reference will be made below.

The volume of the excrements constitutes a relatively small portion of the total waste volume from a household. Chiefly for the purpose of keeping the air passages between the excrement compartment and the garbage compartment free the former compartment should be so big that, normally, its contents will only fill out a minor portion of the height of the compartment.

In a container of the type shown on the drawings, i.e., a container for a normal household, the length of the excrement compartment may be chosen in such a manner that the compartment can easily be connected to the building. The inner width of the container may be of the order of 1 meter (3 to 4 feet). The dimensions given in this specification refer to a container of the smallest suitable size.

The top edge of the garbage compartment may be located at such a distance above the ground surface that the interior of the compartment is conveniently accessible. If desired, that compartment may be equipped with a pipe leading to the house and serving as a rubbish chute. Generally, the volume of the garbage compartment should be considerably greater than that of the excrement compartment. The minimum volume of the garbage compartment is about 1.5 m.$^3$ (50 cubic feet). The proportions of the compartment may be varied, the most important requirement being that of a good air supply to the waste mass. When the garbage compartment is high, an excessive compression and insufficient air supply may be avoided by means of downwardly open U-shaped channels placed within the compartment so that they form a grid-like structure substantially parallel to or, if desired, somewhat less inclined than the bottom of the container. Such a construction is shown on the drawings. Suitably, the inner height and width of the channels should not exceed 5 cms. (2 inches) and their mutual spacing may be about 15 cms. (6 inches). If the level of the excrements can reach the channel orifices in that compartment they should be provided with shields so that no clogging can occur.

The storage compartment should have such a shape that its contents form a layer of relatively small depth having a great surface in contact with the air. Additionally, the volume of the compartment should be so great that the compartment can receive waste during a suitable period of time, e.g. 1 year. Also in order to facilitate removal of the contents of the compartment its length should be at least 1.5 ms. (5 feet).

The air passages in the partitions should be distributed over the entire surfaces of said partitions. The top passages, or channels, should be relatively large so that efficient air circulation in the container and ventilation of the upper layers of the waste is made possible. On the other hand, the length of the passages should not be greater than necessary for preventing the waste from falling therethrough. The partitions may be constituted by perforated plates or by grids. The partition between the excrement compartment and the garbage compartment should extend to a level at such a height above the bottom of the container that the garbage does not unduly occupy the space of the excrement compartment. On the other hand, a certain mixing of the various types of waste is desirable and has an advantageous influence with regard to moisture distribution, porosity and air supply. The partition between the garbage compartment and the storage compartment has for its object to prevent unmouldered waste in the top layer of the garbage compartment from falling down onto the mouldered waste in the storage compartment. The orifices at the bottom are given such a height that only such waste that is substantially transformed can pass down to the storage compartment. In a container of the type shown on the drawings the height of the orifice may be about 30 cms. (1 foot). The height should also be matched to the volume and to the height of the waste in the garbage compartment as well as to the length of the storage compartment.

The ventilation of the waste masses is of great importance to the desired transformation process and does to a high degree determine the design of the container and its compartments. As already mentioned, care must be taken so that the area in contact with the air passing through the arrangement becomes sufficiently large. This condition is fulfilled if the compartments are dimensioned in such a way that their contents form layers of comparatively little depth and with a large top surface. This condition is especially critical as far as the excrement and storage compartments are concerned. If desired, the garbage compartment may be relatively short and high, as the ventilation of its contents is aided by the air passages in the partitions and by the air channels, if any.

Due to the heat generated in the waste the air within the container is forced from the air inlet at low level in the storage compartment towards the air outlet in the top part of the container. The air flow is also improved due to the fact that the covers of the compartment are inclined as above described.

The container may be compared to a furnace; the excrement and garbage compartments corresponding to the combustion chamber; the storage compartment to the ash-box; and the air outlet to the chimney. If portions of the compartment walls and covers are made from a transparent material, the heating of their contents is increased due to radiation from the sun so that the transformation process is accelerated.

In a container designed for continuous operation the contents of the garbage compartment will after a certain time, e.g. a couple of months, rise to a level located at a considerable distance above the bottom but will afterwards remain fairly constant on that level.

Thanks to the inclination of the bottom of the container, already mouldred waste continuously moves downwards to the storage compartment as further waste is supplied to the excrement and garbage compartments. During the course of that supply the underlying layers collapse and moulder. During that process the volume of the waste is decreased to a fraction of the original volume which explains the reason that the displacement in the bottom layer is slow. Especially when the height of the waste in the garbage compartment is great the material is, disregarding the magnitude of the bottom inclination, pressed out through the orifice towards the storage compartment. However, when the bottom inclination is too small, a stagnation does ultimately occur. Too great an inclination results in insufficiently mouldered waste passing down into the storage compartment and is collecting in the lower portion thereof where it successively forms a deep layer, the bottom portion of which is constituted by the oldest waste. It is then obviously difficult to remove that portion. Another disadvantage is that the moisture concentration easily becomes too high and the concentration of oxygen too low so that anaerobic processes take place in said bottom layer. Experiments indicate that the inclination of the bottom can be varied within but relatively narrow limits. Suitably, the inclination should amount to between 1:4 and 1:3 (corresponding to 14 and 18.5°, respectively). Relatively minor deviations from these values usually result in an unsatisfactory operation.

The inclination of the bottom container need not be constant along the length thereof nor is it necessary that it follows a straight line. The profile may be curved or stepped. According to one embodiment the uppermost portion may have an inclination of 1:3, the central portion an inclination of 1:3.5 and the lowermost portion an inclination of 1:4. If a stepped configuration is used the steps may be located straight below the partitions and the inclinations of the different step portions may or may not be the same.

If the total length of the container is about 3.5 ms. (12 feet) and the inclination about 16° the height difference between the highest and the lowest portions of the bottom will be about 1 m. (3 feet). The depth of the excrement compartment may be at least 1 to 1.5 ms. (3 to 5 feet).

As shown on the drawings the container may be defined by plane surfaces. However, it may as an alternative be entirely or partly composed by cylindrical pipe elements. Further, it is possible to manufacture it in one piece, e.g., through casting, or to join prefabricated elements permitting variations in shape as well as in size. Provided that attention is paid to the facts concerning the design of the container which determine the operability of the arrangement the rest of it may be varied in accordance with the actual conditions and fields of use.

Although the embodiment illustrated on the drawings comprises three compartments it is to be understood that two compartments as well as four and more compartments may alternatively be used. If only two compartments are used one of them forms the reception compartment and the other the storage compartment. That embodiment is of particular value when the excrements originate from animals so that no attention has to be paid to the risk of odours.

Finally, it should be pointed out that the arrangement may also be designed as a central for receiving organic waste and for transforming it biologically which central is not directly connected to any closets and which may operate with or without supply of such substances. An important advantage is that the process occurs entirely automatically and that the final product contains considerable amounts of humus-forming substances.

What is claimed is:

1. An arrangement for the aerobic biological transformation of organic waste material which includes:
    (a) a generally rectangular-shaped container consisting of side walls, end walls and a bottom wall joined together tightly enough to prevent the undesired escape of any liquid or solid material that is introduced into the container,
    (b) the bottom wall of said container being inclined at an angle between about 10° and 25° with respect to the horizontal along a major portion of the distance between the end walls, (c) the container being generally divided into three compartments by two downwardly depending partition members disposed transversely across said container at spaced distances above the bottom wall, (d) said compartments consisting of an uppermost compartment for the reception of human excrement, an intermediate compartment for the reception of garbage and a lowermost compartment for the storage of materials transformed in said first and second compartments, (e) a cover means for each of said compartments, (f) the lower portions of said three compartments being in open communication with each other by virtue of the fact that said downwardly extending partitions do not extend to the bottom wall of said container, and (g) ventilating means for the passage of air from said storage compartment, through said garbage compartment and then into and out of said excrement compartment.

2. An arrangement according to claim 1 wherein at least one U-shaped channel interconnects the lower portions of said two partitions, said channel being essentially parallel to the bottom wall of the container and containing a plurality of air inlets for permitting an increased supply of air to any waste passing through the garbage compartment.

3. An arrangement according to claim 1 wherein the cover means for each compartment is provided with access means to that compartment.

4. An arrangement according to claim 1 wherein said excrement compartment is located below the toilet room of a house.

5. An arrangement according to claim 1 wherein said ventilating means comprises air inlets in the end wall of the storage compartment, air passages in the upper portions of said partitions and a gas outlet adjacent the uppermost portion of said excrement compartment.

6. An arrangement for the aerobic biological transformation of organic waste material which includes:

(a) a container formed by tight side walls, a bottom wall and a cover means which in combination prevent the undesired escape of any liquid or solid material introduced into the container.

(b) the bottom wall of said container being generally inclined in a downward direction from one end to the other, (c) said container being generally divided into at least two compartments by at least one partition wall depending downwardly from said cover means and disposed transversely across said container, (d) at least one of said compartments being a reception compartment for the reception of organic waste material, (e) at least one of said compartments being a storage compartment for the storage of material received from said next adjacent reception compartment, (f) the inclined bottom wall portion of said storage compartment being at a generally lower level than the inclined bottom wall of said next adjacent reception compartment, (g) said compartments being provided with intercommunicating ventilation means and said compartments also communicating with each other by means of passageways adjacent the lower portions of said partitions.

References Cited in the file of this patent
UNITED STATES PATENTS

| | | |
|---|---|---|
| 1,415,719 | Schollenberger | May 9, 1922 |
| 1,567,414 | Bogart | Dec. 29, 1925 |
| 2,049,889 | Boniface | Aug. 4, 1936 |
| 2,178,818 | Earp-Thomas | Nov. 7, 1939 |
| 2,474,833 | Eweson | July 5, 1949 |
| 2,989,379 | Gilberton | June 20, 1961 |